Figure 1:
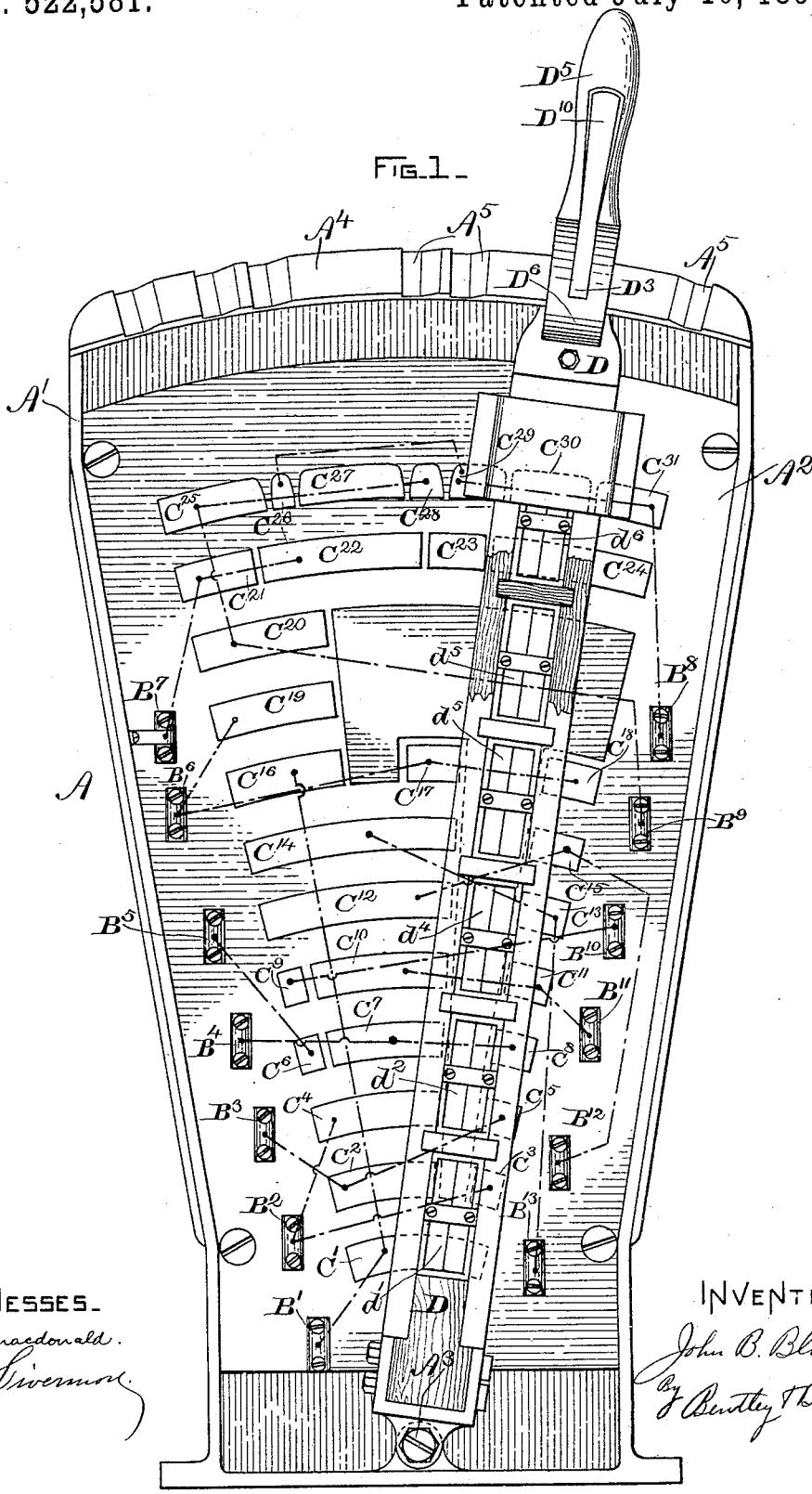

(No Model.) 4 Sheets—Sheet 1.

J. B. BLOOD.
CONTROLLER FOR ELECTRIC MOTORS.

No. 522,581. Patented July 10, 1894.

WITNESSES
A. F. Macdonald
H. J. Livermore

INVENTOR
John B. Blood,
By Bentley & Blodgett
Attys.

(No Model.) 4 Sheets—Sheet 3.
J. B. BLOOD.
CONTROLLER FOR ELECTRIC MOTORS.
No. 522,581. Patented July 10, 1894.
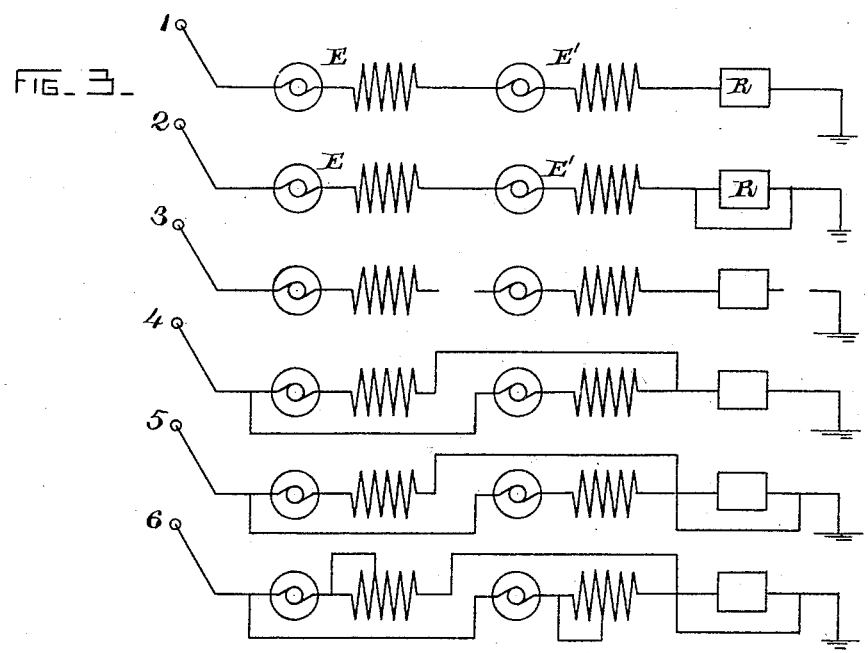
Fig. 3.
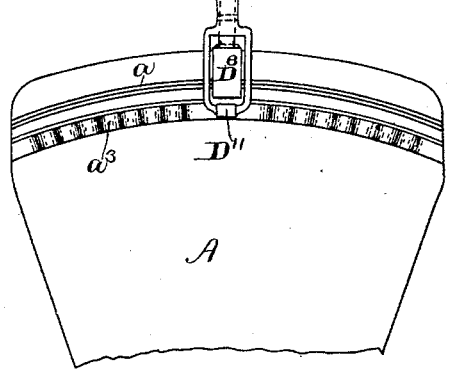
Fig. 8.
Fig. 7.
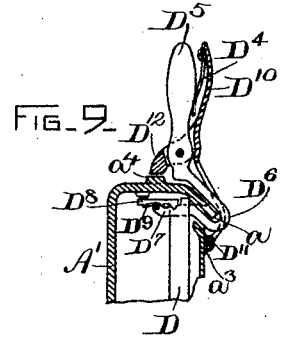
Fig. 9.
WITNESSES  
A. F. Macdonald.  
F. A. Daly.
INVENTOR  
John B. Blood  
By Bentley & Blodgett  
Attys.

(No Model.) 4 Sheets—Sheet 4.
J. B. BLOOD.
CONTROLLER FOR ELECTRIC MOTORS.
No. 522,581. Patented July 10, 1894.
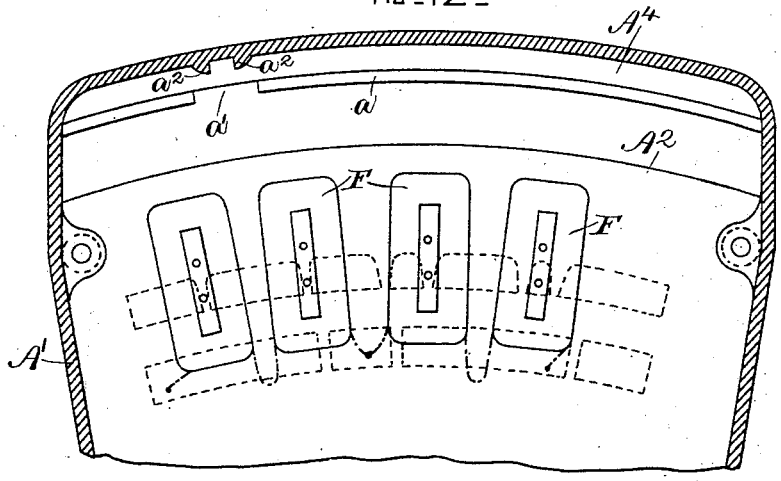
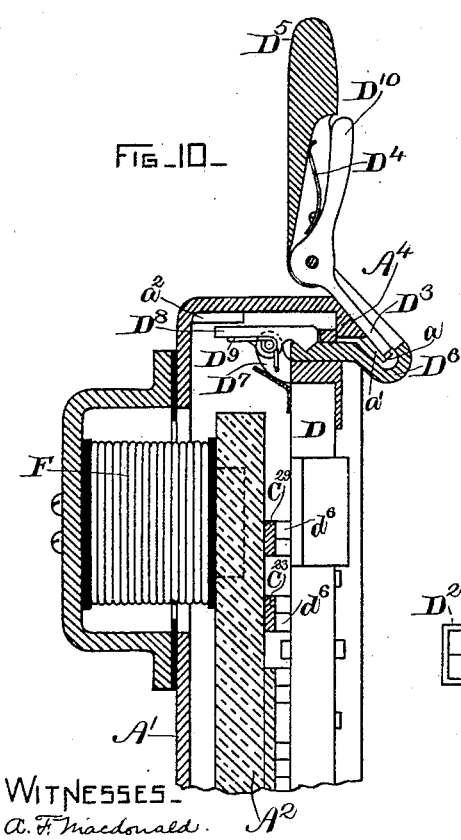
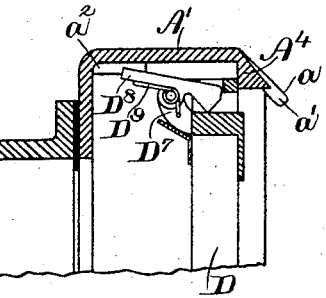
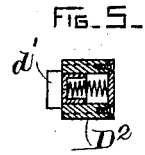
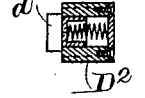
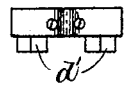
WITNESSES:
A. F. Macdonald
A. A. McBride
INVENTOR
John B. Blood,
By Bentley & Blodgett
Attys.

UNITED STATES PATENT OFFICE.

JOHN B. BLOOD, OF LYNN, ASSIGNOR TO THE GENERAL ELECTRIC COMPANY, OF BOSTON, MASSACHUSETTS.

CONTROLLER FOR ELECTRIC MOTORS.

SPECIFICATION forming part of Letters Patent No. 522,581, dated July 10, 1894.

Application filed December 18, 1893. Serial No. 493,886. (No model.)

*To all whom it may concern:*

Be it known that I, JOHN B. BLOOD, a citizen of the United States, residing at Lynn, in the county of Essex and State of Massachusetts, have invented certain new and useful Improvements in Controllers for Electric Motors, of which the following is a specification.

My invention relates to controllers for electric motors, and consists in certain new and useful improvements in the switch employed in effecting such regulation and in the means for operating the same.

The invention is especially applicable to electric railway cars, and effectually accomplishes the following objects: First, the use of a reversing switch in connection with the controller is obviated by having the controlling switches at opposite ends of the car cross-connected, so that the operation of one of said switches causes the car to move in one direction while the other switch controls its movement in the opposite direction. Further cross-connections are provided, however, at each switch whereby a backward movement of the car may be accomplished by means of a backward movement of the switch in use, but it is desirable that such operation of the controller be limited in its scope, because the chief occasion for backing is caused by the missing of a switch or some similar mishap, to rectify which it is only necessary that the car should move a few feet, and by such limitation the possibility of running the car backward at any considerable rate of speed is prevented. Secondly, the switch handle is provided with a locking device, which renders it impossible for an operator or motor-man, in a moment of excitement, to suddenly reverse the switch by pulling the handle back until the cross-connections above mentioned are connected by the switch-contacts. Third, an auxiliary locking device prevents the removal of the controlling handle from the switch-arm, except when said switch arm is in the neutral position with no current passing through the motors, and its removal at this point automatically locks the said switch arm in this position so that it is impossible for an unauthorized person to tamper with it.

Figure 2:
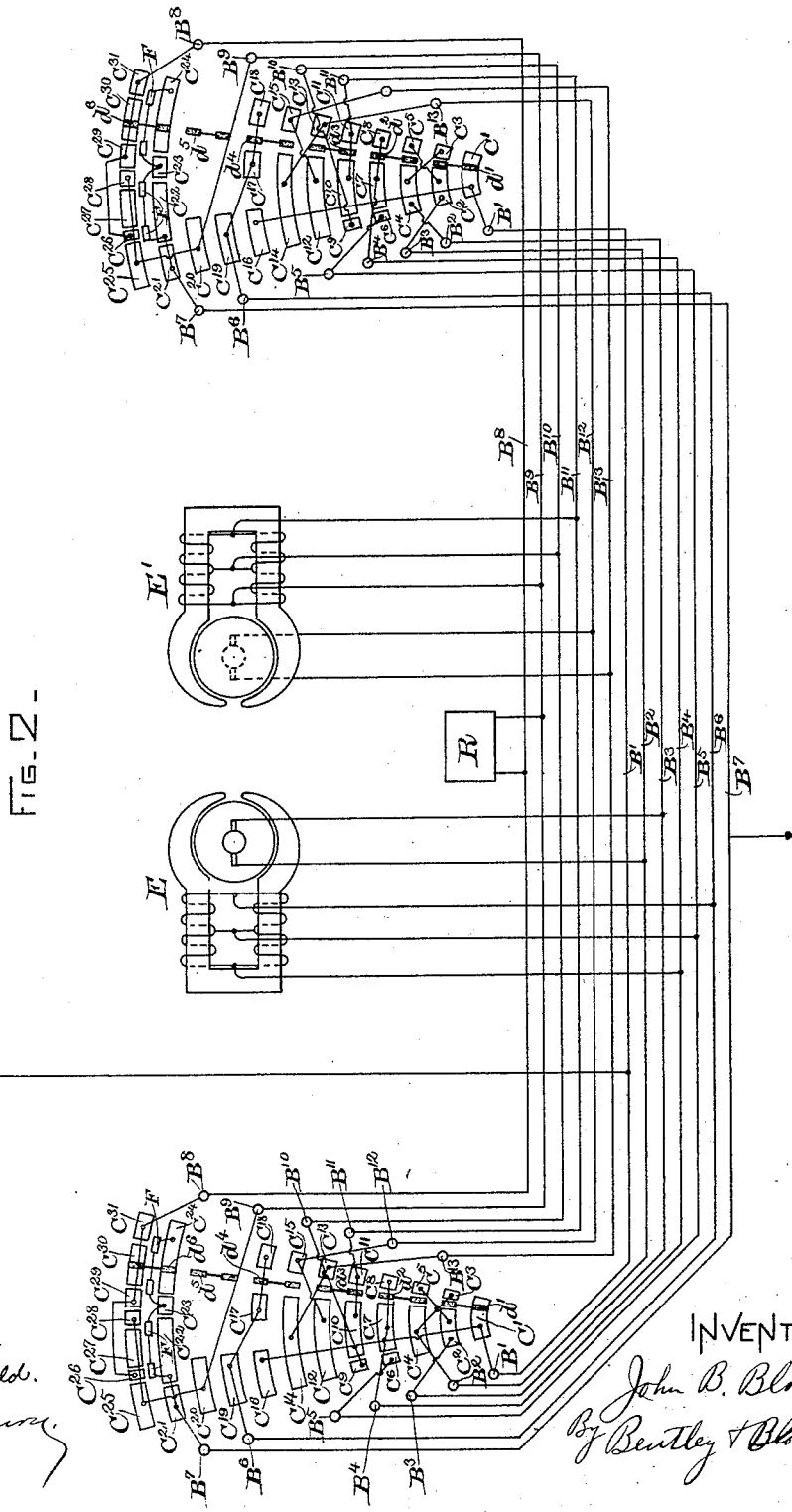

In the accompanying drawings, Figure 1 is a diagram of the controller, showing the contacts, permanent connections and movable operating lever. Fig. 2 is a diagram of two opposite controllers and the connections between them and two motors to be controlled. Fig. 3 is a diagram of the consecutive motor connections from starting to full speed. Figs. 4, 5 and 6 are details showing the brushes or movable switch contacts. Figs. 7, 8 and 9 are details of the locking device for the operating handle; and Figs. 10, 11 and 12 are details of a modification thereof on a larger scale.

Referring to Fig. 1, the controller stand A consists of a suitably shaped frame A' upon which is screwed, or otherwise fastened, a base-plate $A^2$ of slate, or other insulating and refractile material. Through this plate project binding-posts B', $B^2$, &c., electrically connected, preferably back of said base-plate $A^2$ to the different contact-plates C', $C^2$, &c. To these binding posts by suitable circuits are connected the armature and field terminals of the motors, the trolley, and the ground connection, as is best shown in Fig. 2. The wires comprising these circuits are lettered B', $B^2$, &c., to correspond with the binding-posts to which they are connected in order to facilitate the tracing of the circuits. The movable or operating portion of the switch consists of an arm or lever D mounted upon a pivot $A^3$ at the base of the controller-stand A and said lever carries a number of pairs of contact brushes $d'$, $d^2$, &c., each pair of brushes being electrically connected together by means of a metal box $D^2$ best shown in Figs. 4, 5 and 6, in which box said brushes are clamped.

In the drawings, the lever D is shown in its neutral position, with the circuit broken between trolley and ground. At the upper part of controller-stand A is a notched slide $A^4$ against which the lever D abuts, and said slide is provided with notches $A^5$ into which a latch or locking device $D^3$ upon the lever D (see Fig. 10) is pressed by a spring $D^4$. As shown in Fig. 1, the left hand sides of these notches which lie to the left of the lever D are perpendicular, while the right hand sides are inclined, and the opposite is true of the notch to the right. Thus, when the said lever is moved to the left, starting the motors, the latch $D^3$ will drop into the first notch, stopping the lever at that point, and necessitating the lifting of the latch by the handle $D^{10}$ provided for that purpose (Fig. 10) before a further step can be taken. Thus the progressive steps of the controller from slow to high speed are limited and determined by the said notches, which are so situated that when the lever rests in any of them, the connections of the motors are such as to afford efficient running conditions.

The consecutive conditions of the circuit are shown in Fig. 3 and numbered from 1 to 6. Referring to said Fig. 3 the motors are first in series with a resistance, second in series with resistance shunted, third, the circuit is momentarily broken preparatory to the fourth position in which the motors are in parallel with a resistance in series, fifth, the resistance is shunted, and sixth, a portion of the field of each motor is also shunted. It is to be noted that the circuit in the third position is broken in more than one place, thus lessening the liability of arcing at the contacts.

The first circuit may be traced as follows (Fig. 2): trolley to binding-post $B'$, contact $C'$, brushes $d'$, contact $C^2$, binding-post $B^3$, armature of motor E, binding-post $B^2$, contact $C^4$, brushes $d^2$, contact $C^7$, binding-post $B^4$, field of motor E, binding-post $B^6$, contact $C^{19}$, contact $C^{17}$, brushes $d^4$, contact $C^{14}$, contact $C^{13}$, binding-post $B^{13}$, armature of motor $E'$, binding-post $B^{12}$, contact $C^{15}$, contact $C^{12}$, brushes $d^3$, contact $C^{10}$, contact $C^{11}$, binding-post $B^{11}$, field of motor $E'$, resistance R, binding-post $B^8$, contact $C^{31}$, contact $C^{29}$, brushes $d^6$, contact $C^{23}$, blow-out magnets F, binding post $B^7$, to ground. If the switch arm is moved ahead into the successive positions determined by the notches $A^5$, Fig. 1, the circuits shown in Fig. 3 can be successively traced, while if the arm is moved to the right, so that the brushes rest on contacts $C'$, $C^3$, $C^5$, &c., the circuit will be the same as that above traced but with the armature terminals reversed.

The controller at the right of the drawings is similar to the one already described, but the armature terminals are so connected as to take current in the opposite direction. The blow-out magnets F are provided to extinguish any arc that may be formed between contacts $C^{26}$ and $C^{27}$, $C^{27}$ and $C^{28}$, &c., incident to cutting out the resistance, and an examination of the circuits will show that said magnets are constantly connected in series between trolley and ground during the operation of the controller; the construction and arrangement are clearly shown in Fig. 12.

By providing only a single set of cross-connected reversing contacts at each controller, the construction of the controller is much simplified, while its utility is practically increased, since such an arrangement obviates the danger of backing the motors at a greater speed than is necessary. In the case of a street car, for example, where two oppositely acting controllers are employed, one at each end, it is manifestly better to put it out of the motor-man's power to run at high speed unless he is at the front of the car, although it is a matter of convenience to be able to run the car back slowly for a few feet under some circumstances without the necessity of going to the other end of the car. Such an arrangement is of course useful in any case where the normal operation of the motor is in one direction, but where occasional reversals may become necessary, and while such reversal is not necessarily limited to the first or starting speed, such speed is all that is usually required.

The switch or controller is operated by a handle $D^5$ shown in Figs. 7, 9 and 10. Referring to Fig. 9 the said handle is provided with an extension $D^6$ at its lower portion adapted to engage with the switch arm D which is suitably recessed to receive it. A guard $a$ along the top of the controller stand prevents the insertion or removal of the handle, except at a point opposite the neutral position of the switch-arm where a slot $a'$, best shown in Fig. 12, is cut so that the extension $D^6$ can pass through. The said extension is so shaped as to form a loop around the said guard, admitting of a lateral movement of the handle in operating the switch. The switch-arm is provided with a lug $D^7$ upon which is pivoted a latch or detent $D^8$, adapted to be engaged by the extension $D^6$ and held in the position shown in Figs. 9 and 10, but provided with a spring $D^9$, tending to force it upward, upon the removal of the handle, into the space between the lugs $a^2$ upon the upper shell of the controller-stand, thereby locking the switch-arm and preventing any lateral movement thereof.

It is obvious that a handle, substantially as above described, can be applied to a controller of any kind, but in any event it is desirable that means be provided for controlling the movement thereof and determining the consecutive positions in which the switch-arm may be brought to rest; in other words, the "running-positions" so called.

In Figs. 7 and 8 the handle is applied to a controller in which the neutral or open-circuit position of the switch is between two sets of contacts, one set adapted to control the circuit in one direction, and the other set in the opposite direction. In this case a corrugated or notched rack $a^3$, a desirable shape being shown in Fig. 8, extends along the front of the controller stand, and is engaged by the latch or detent $D^{11}$ pivoted to the handle $D^5$ and operated by a grip $D^{10}$. A spring $D^4$ tends to keep the latch $D^{11}$ in engagement with the notches or depressions in the rack $a^3$. If, therefore, it is desired to move the handle in either direction from the position shown in Fig. 7, the grip is depressed by the hand of the operator so that the latch comes out of engagement with the corrugations, and the handle is free to move until the grip is released, when the latch dropping into a notch or depression holds the switch until it is desired to move it farther.

In order to prevent the possibility of a too sudden reversal of the motors by a careless operator, a lug $a^4$, Fig. 9, is provided upon the top of the controller-stand at the neutral position of the switch-arm, and said lug is adapted to be engaged by an extension $D^{12}$ upon the grip $D^{10}$ when said grip is depressed. Thus if the controller is in any of the running positions, and the operator, depressing the grip attempts to throw the handle across the neutral point, the handle will be stopped by the lug $a^4$, and the grip will have to be released until said neutral point is passed. A flat depression of some length is provided in the corrugated rack at this point, as shown in Figs. 7 and 8 to admit of the handle passing the neutral point without depressing the grip.

In Figs. 10 and 11 a slight modification of the handle is shown, the rack $A^4$ with notches $A^5$ already described in connection with the special form of controller shown in Fig. 1, being substituted for the corrugated rack $a^3$ shown in Figs. 7 and 8. In this case the stop $a^4$ is not shown, although it might obviously be employed if desired.

It should be understood that the removable handle stop, and locking devices are applicable to switches or controllers of any kind, rheostats for example, and I do not intend to limit the invention to such devices applied to any especial type of controller.

What I claim as new, and desire to secure by Letters Patent of the United States, is—

1. A switch or controller for electric motors adapted to start the motors in one direction and regulate their movement from rest to highest speeds, and in the reverse direction to start and cause them to operate at lowest speed, only, as set forth.

2. A switch or controller for two or more electric motors comprising a number of contacts adapted to vary the motor relations when connected in successive combinations by a moving switch member from series to parallel with current flowing in one direction, and a number of other contacts corresponding thereto and adapted to connect the motors in series with current flowing in the reverse direction when bridged by said moving member, as set forth.

3. In a switch or controller for electric motors, the combination of a fixed member having contacts connected to the terminals of the motors, a moving member bridging such contacts and adapted to vary the current relations of the motors so that variations of speed may be obtained, and a second set of fixed contacts also in the path of said moving member, and cross connected to the terminals of the motors so as to reverse the current therein, as set forth.

4. In a controller for electric motors comprising a movable switching device, a detachable operating handle for said device, and means for automatically locking said device when said handle is detached, as set forth.

5. In a controller for electric motors comprising a movable switching device, the combination with an automatic lock for holding said switching device in a predetermined position, of a separate handle adapted to unlock said device and operate the said device, and means for preventing the removal of said handle except when said device is in said predetermined position, as set forth.

6. In a controller for electric motors comprising a movable switching device, a detent adapted to hold said movable device in any of a number of predetermined positions, and means for manually disengaging said detent and moving said device, in combination with a stop for said device normally out of the path thereof but in its path when said detent is disengaged, as and for the purpose set forth.

7. In a controller for electric motors, the combination with a movable switch-arm, of an overhanging guard or projection covering the top of said switch-arm and extending along the path through which it moves, an operating handle having a looped projection passing around said guard into engagement with said switch-arm, and a slot or opening in said guard at a predetermined position in the path of the switch-arm for the attachment or removal of said handle, as set forth.

8. In a switch or controller having a stationary member and a movable member, the combination with a detent attached to said movable member and adapted to automatically engage with any of a series of stops upon the fixed member, of means for disengaging said detent, and an additional stop also on the fixed member and normally out of the path of said detent, but adapted to engage said detent when thus disengaged from said series of stops, as set forth.

9. The means for limiting the movement and determining the consecutive resting-points of the moving member of a switch or controller, comprising a notched or corrugated rack extending along the path through which said member is movable, a lock or latch movable with said member and adapted to automatically engage with said rack, and means for disengaging same, in combination with a co-operating lock or latch, and a stop at a predetermined position in the path of said member, adapted to be engaged by said cooperating latch when said first named latch is disengaged, as and for the purpose described.

10. The means for automatically locking the moving member of a switch or controller in a predetermined position, consisting of a stop upon the fixed member thereof, a spring latch upon said moving member adapted to engage with said stop, and a separate unlocking device for disengaging said latch, as set forth.

11. In a switch or controller having a fixed member and a movable member, the combination with a stop upon said fixed member, of a latch upon said movable member, a detachable operating handle adapted when in place to hold said latch out of engagement with said stop and means whereby said latch automatically engages with said stop when said handle is detached, as set forth.

In testimony whereof I hereunto set my hand this 14th day of December, 1893.

JOHN B. BLOOD.

Witnesses:
JOHN W. GIBBONEY,
BENJAMIN B. HULL.